(12) United States Patent
Dacier et al.

(10) Patent No.: US 6,487,204 B1
(45) Date of Patent: Nov. 26, 2002

(54) DETECTABLE OF INTRUSIONS CONTAINING OVERLAPPING REACHABILITIES

(75) Inventors: Marc Dacier, Adliswil (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,273

(22) Filed: May 12, 1999

(51) Int. Cl.$^7$ ............................................... H04L 12/56
(52) U.S. Cl. ....................... 370/395; 370/397
(58) Field of Search ................ 370/395, 401, 370/397, 389, 466

(56) References Cited

U.S. PATENT DOCUMENTS

| | | | | |
|---|---|---|---|---|
| 5,831,975 A | * | 11/1998 | Chen et al. | 370/256 |
| 5,999,517 A | * | 12/1999 | Koning et al. | 370/255 |
| 6,078,575 A | * | 6/2000 | Dommety et al. | 370/338 |
| 6,115,753 A | * | 9/2000 | Joens | 709/242 |
| 6,151,319 A | * | 11/2000 | Dommety et al. | 370/395 |
| 6,262,984 B1 | * | 7/2001 | Rochberger | 370/395 |
| 6,333,918 B1 | * | 12/2001 | Hummel | 370/238 |

OTHER PUBLICATIONS

"Private Network to Network Interface Specification Version 1.0" Mar. 1996—ATM Forum.

* cited by examiner

*Primary Examiner*—Ken Vanderpuye
(74) *Attorney, Agent, or Firm*—Christian Heusch

(57) ABSTRACT

In an ATM network operating in accordance with PNNI standards, the operation of a switch is divided into two phases, a learning mode phase and an active mode phase. During learning mode phase, each time a reachability is received from a sending switch, the reachability is recorded in the database of the receiving switch and the received reachability is sent to other switches in the same peer group. At the end of the learning mode phase, the database of each of the switches contains the reachabilities advertised by all the switches of the peer group during the learning mode group phase. On a termination of the learning mode, the switches enter the active mode phase. During the active mode, each time a reachability is received from a sending switch, the receiving switch checks to see if the reachability has been advertised in the past by that sending switch. If it has, the reachability is considered to be valid and the receiving switch waits for the next reachability. On the other hand, if the particular reachability has never been announced before the sending node, it is compared to the reachability in the database for all other nodes of the peer group. If the reachability causes the reachability from other node to be overlapped and the overlapping is suspicious, then an alarm is raised.

12 Claims, 4 Drawing Sheets

DETECTABLE OF INTRUSIONS CONTAINING OVERLAPPING REACHABILITIES

FIELD OF THE INVENTION

The invention relates to communication networks and more particularly, to preventing third party intrusions attempting to divert information being communicated on the network between parties.

BACKGROUND OF THE INVENTION

A set of signalling and routing protocols called Private Network-to-Network Interface (PNNI) standards is used on Asynchronous Transfer Mode (ATM) networks. PNNI is a comprehensive signalling standard providing dynamic routing capabilities and supporting Quality of Service (QoS) parameters for ATM networks. PNNI standards have been approved by the ATM Forum in 1996 and are described in a March 1966 publication by the ATM Forum called "Private Network to Network Interface Specification Version 1.0". This publication is hereby incorporated by reference.

In order to establish and update routing paths and to reroute a path in case of link failure ATM network switches have to know the network's topology. It is necessary for a switch to know whether there is an available network path through it that has the required bandwidth and can support end-to-end QoS before that switch can accept a call without compromising the call's integrity. To this end, each switch maintains a database of the networks topology. To reduce the amount of information each switch has to maintain in its database about the topology of the network, the PNNI standard provides that the network can be logically defined as a hierarchy with nodes on each level of the hierarchy arranged in peer groups.

Under PNNI, the switches exchange information with one another on a regular basis to inform every switch about changes in the topology of the network. The information exchange is performed using a process called "flooding". Flooding involves a hop-by-hop propagation of topology information in packets to all the switches in a peer group and to adjoining switches of other peer groups. Information about network topology is provided in PNNI Topology State Elements (PTSEs). When a PTSE is received at a switch, it is acknowledged by sending an acknowledgement packet back to the sending switch. If the PTSE contains information which is new or of more recent origin than that stored in the database of a receiving switch, that data is placed in the database for the receiving switch and the PTSE is transmitted to all neighbor switches of the receiving switch except the one from which the PTSE was received.

Along with other information, certain PTSE's contain reachablility information of the sending switch. Reachability information comprises the sending switches identity, address prefixes which describe the destinations that can be handled by the sending switch, and the length of the address prefixes. Thanks to the protocol, all the switches in a given peer group have the same vision of the network. That is, the topology databases of each of the switches belonging to the same peer group are identical in steady state. As a consequence, all the switches in a peer group know the reachability of the other switches of their peer group. Therefore, a malicious user through use of an intervening switch in a peer group knows exactly the reachabilities advertised by the other switches in that peer group, and can advertise the right prefixes in the intervening switch to "overwrite" other switches in the peer group to thereby divert information through the intervening switch so that the user can obtain access to it. The diversion of the information is transparent to the sending party and an intended receiving party as long as information is transmitted to the receiving party through the intervening switch without changing the characteristics of the connection (throughput bandwidth, cost, etc.).

Therefore, it is an object of the present invention to protect the secrecy of information communicated on a PNNI network It is another object of the present invention to provide protection against the use of overlapping reachabilities to divert information communicated on the network.

It is a further object of the invention to provide an improved PNNI network.

BRIEF DESCRIPTION OF THE INVENTION

In accordance with the present invention, the operation of switches in the network are divided into two phases, a learning mode phase and an active mode phase. During learning mode phase, each time a receivability is advertised by a sending switch, the reachability is recorded in the database of the receiving switch and the received reachability is sent to other switches in the same peer group. At the end of the learning mode phase, the database of each of the switches of the peer group contains the reachabilities advertised by all the switches of the peer group received during the learning mode group phase. During the active mode, each time a reachability is received from a sending switch, the receiving switch checks to see if the reachability had been already advertised in the past by that sending switch. If it has, the reachability is considered to be valid and the receiving node waits for receipt of the next reachability. on the other hand, if the particular reachability has never been announced before by the sending switch, the receiving switch compares it to the reachabilities in the database for all other switches of the peer group in order to determine if the reachability causes another switch in the peer group to be overlapped.

A switch is overlapped when the reachability of another switch in its peer group exceeds its reachability. one reachability exceeds another when its prefix is longer than the other. In its basic form, the intrusion algorithm examines the length of the prefixes and triggers an alarm when it detects that the new reachability is an overlapping reachability. However, to limit the number of alarms that are triggered, the switch determines if the overlapping reachability is suspicious before triggering the alarm to have the network supervisor intercede and determine if the overlapping reachability is problematic.

DESCRIPTION OF THE DRAWINGS

FIG. 3 is another view of one of the peer groups in FIG. 2;

DETAILED DESCRIPTION OF THE INVENTION

Figure 1:
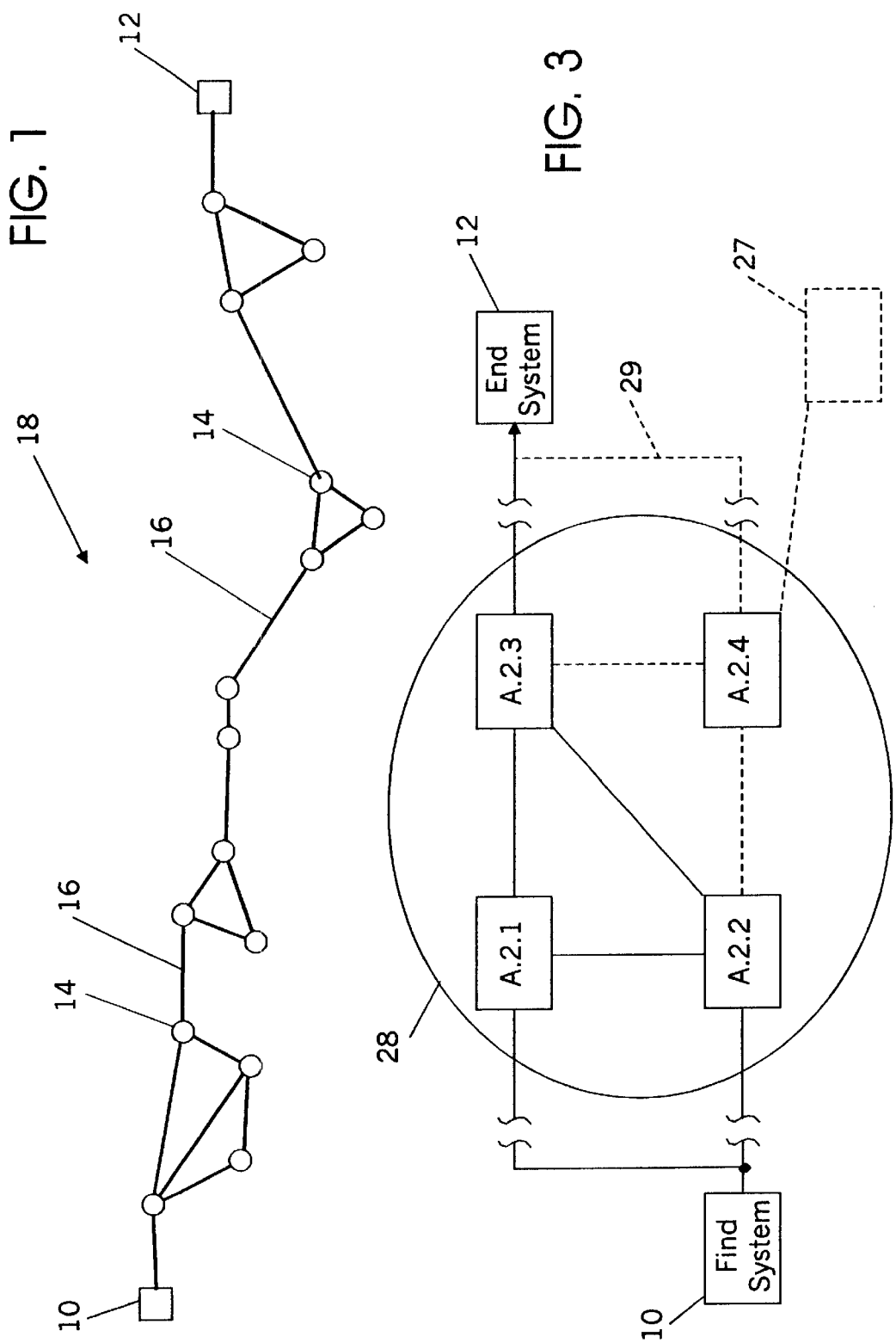
FIG. 1 is a diagram of a physical network containing nodes joined by physical links.

In FIG. 1, the illustrated ATM network 18 passes information from one end system 10 to another end system 12 through intervening switching nodes 14 and physical links 16 in accordance with PNNI standards.

Figure 2:
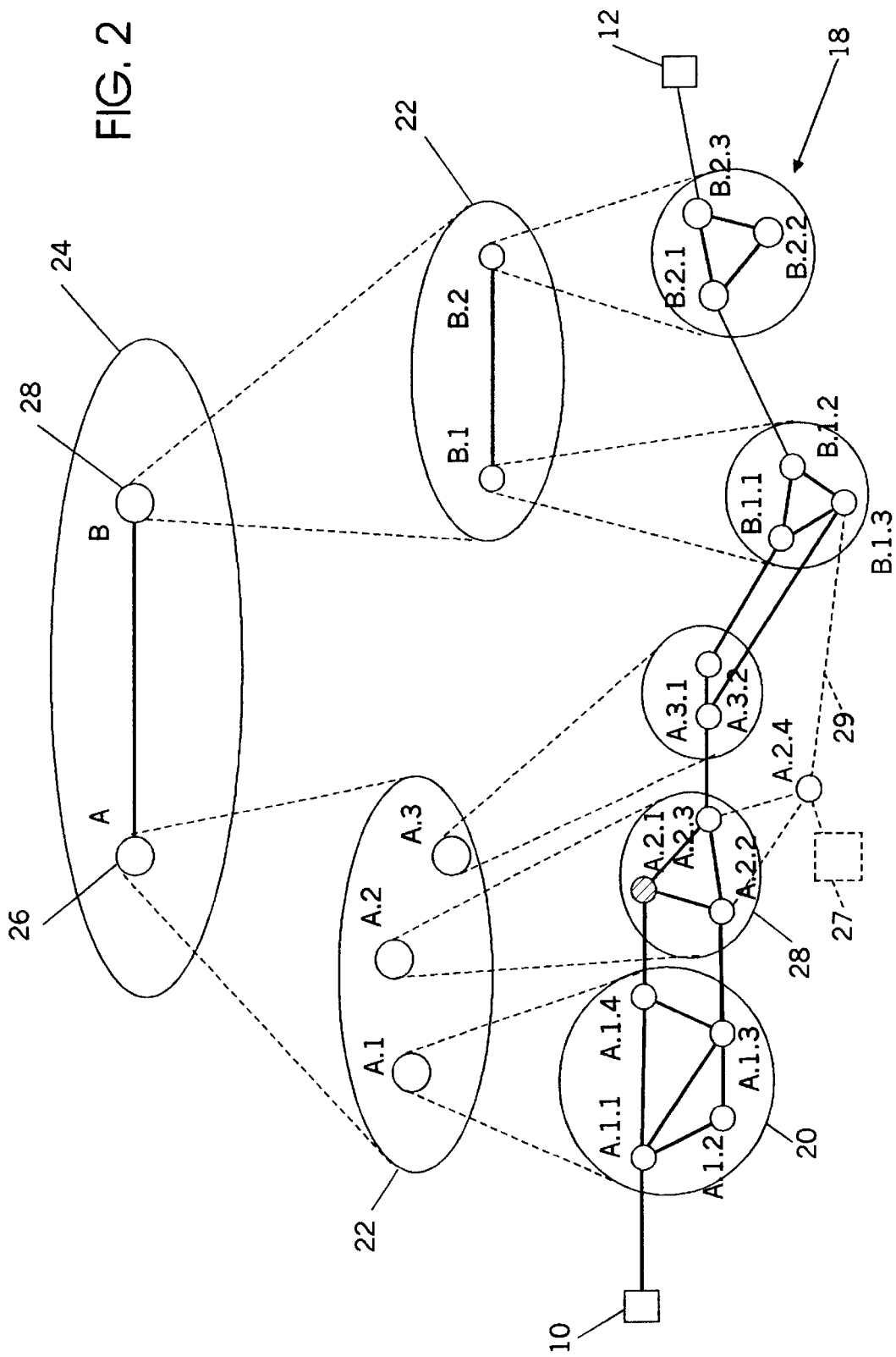
FIG. 2 is the network of FIG. 1 represented as a hierarchy of peer logical nodes arranged in peer groups.

To reduce the amount of information that must be stored in the database of each network switch, the network 18 is addressed, as shown in FIG. 2, as a hierarchy of nodes arranged in peer groups. In such a representation, each peer group 20 of nodes of the lowest or physical level of the network is represented as being a node of a peer group 22 of a next higher level of peer groups which peer groups is in turn are represented as being as a node of the highest level peer group 26. While a three level hierarchy is described to define the network, more or less levels can be used for that purpose. In the illustrated hierarchial representation, the two highest level nodes 26 and 28 are assigned addresses of A and B respectively. Each node in the next lower level of peer groups is prefixed with A or B, the address of their parent node, and also given a unique address within their peer group so that the intermediate level peer groups 22 contain nodes A.1, A.2, A.3 and B.1, B.2. Likewise, the address of the nodes in each of the peer groups in the lowest level of the hierarchy is prefixed by the address of its parent node in the intermediate level, and provided a suffix that uniquely identifies them within their peer group. For instance, the addresses of the nodes in peer group 28 are A.2.1; A.2.2; and A.2.3 where A.2 is the address of their parent node in the intermediate level, and the last number 1, 2, or 3 uniquely identifies each node within peer group 28. Each peer group has a peer group leader (PGL). the PLG represents the current peer group in its parent peer group as a single node called the logical group node (LGN). For instance, in peer group 28, A.2.1 is the peer group leader and node A.2 is the LGN.

As pointed out above, each node advertises a set of reachabilities. A reachability is basically a prefix used to match the destination address for a call setup, the prefix length bit and prefix itself.

The process to select the destination switch is the following:

1. The calling switch receives a"call setup" message that contains the ATM address of the destination device.

2. The switch selects among the reachabilities in its topology database the one featuring the longest prefix matching the destination ATM address.

3. If that route is available, the call is routed to the switch advertising the selected reachability.

4. If that route is not available, another route is selected.

5. If no route is available, an appropriate message is passed to the signalling end system 10.

As stated above, the switch selected for routing is the one advertising the longest matching prefix in its reachabilities. Therefore, a malicious user could configure a switch so that it always advertises longest prefixes to be the destination of the calls it is interested in. This can be done in a very simply because the PNNI protocol uses flooding where, as pointed out above, topology information is passed from switch to switch. As a result of flooding, all the switches in a given peer group (here, peer group 28) have the same vision of the network. That is, the topology databases of switches belonging to the same peer group are identical. Therefore, each switch knows exactly the reachabilities advertised by the other switches and can advertise the right prefix to"overwrite" the switch it wants to. For example, in peer group 28, as shown in both FIGS. 2 and 3, assume the three switches A.2.1; A.2.2 and A.2.3 advertise the following reachabilities.

| Switch | Prefix | Length (bits) |
| --- | --- | --- |
| A.2.1 | 39.99.99.99.01.01 | 48 |
| A.2.2 | 39.99.99.99.01.02 | 48 |
| A.2.3 | 39.99.99.99.01.03 | 48 |

Let us consider a"call setup" to an ATM address starting with 39.99.99.99.01.01.X.Y. In this example, it is obvious that the longest matching prefix is advertised by Switch A.2.1. Therefore, the call will be routed through it. Suppose now that a switch, Switch A.2.4, joins this network and a malicious user wants to use it to capture all the calls for Switch A.2.1, and divert them to end system 27. An obvious and efficient way to do this, is to have Switch A.2.4 advertise the following prefixes.

| Switch | Prefix | Length (bits) |
| --- | --- | --- |
| A.2.4 | 39.99.99.99.01.01.00 | 49 |
| A.2.4 | 39.99.99.99.01.01.80 | 49 |

As one can see in this example, just by advertising two prefixes each one bit longer than the one advertised by Switch A.2.1, Switch A.2.4 will always have the longest matching prefix of the two switches. Once the traffic is rerouted, it is possible for switch A.2.4, using other features of the protocol, to make sure that all communicated information reaches its intended destination through an alternate path 29. The attack is completely transparent for the sender 10 and intended receiver 12 of the rerouted packets, if that re-routing does not change the characteristics of the connection (throughput, bandwidth, cost, etc.).

The present invention will automatically detect the existence of all overlapping reachabilities. However, not all reachabilities generated by one or more switches that overlap other switch reachabilities are suspicious, and not all suspicious overlapping reachabilities are problematic. Actually, there always is overlapping reachabilities. The only ones that are suspicious are those that are not consistent with what is considered as normal. When a suspicious reachability is detected, an alarm is raised to be processed by the network administrator. The administrator determines if the suspicious reachability is problematic.

Not all suspicious reachabilities are malicious but may be problematic. In addition to malicious overlapping reachabilities,"errors" are caused by accidental overlapping reachabilities. The present invention operates on both malicious and accidental overlapping reachabilities.

To distinguish between suspicious and nonsuspicious reachabilities, a model of the"previous behavior" of the network is built from the topology database stored in each of the switches of a peer group. Whenever a new reachability is announced by a switch, a check of the reachability is made in real time to see if it is consistent with what had been observed in the past. An inconsistent change is seen as suspicious and treated as such.

Since all switches of a peer group contain the same data in their topology database, you only need one switch implementing the algorithm described below to detect intrusions taking place at any place in its peer group. There is no need to implement it in each switch of that peer group.

Figure 4:
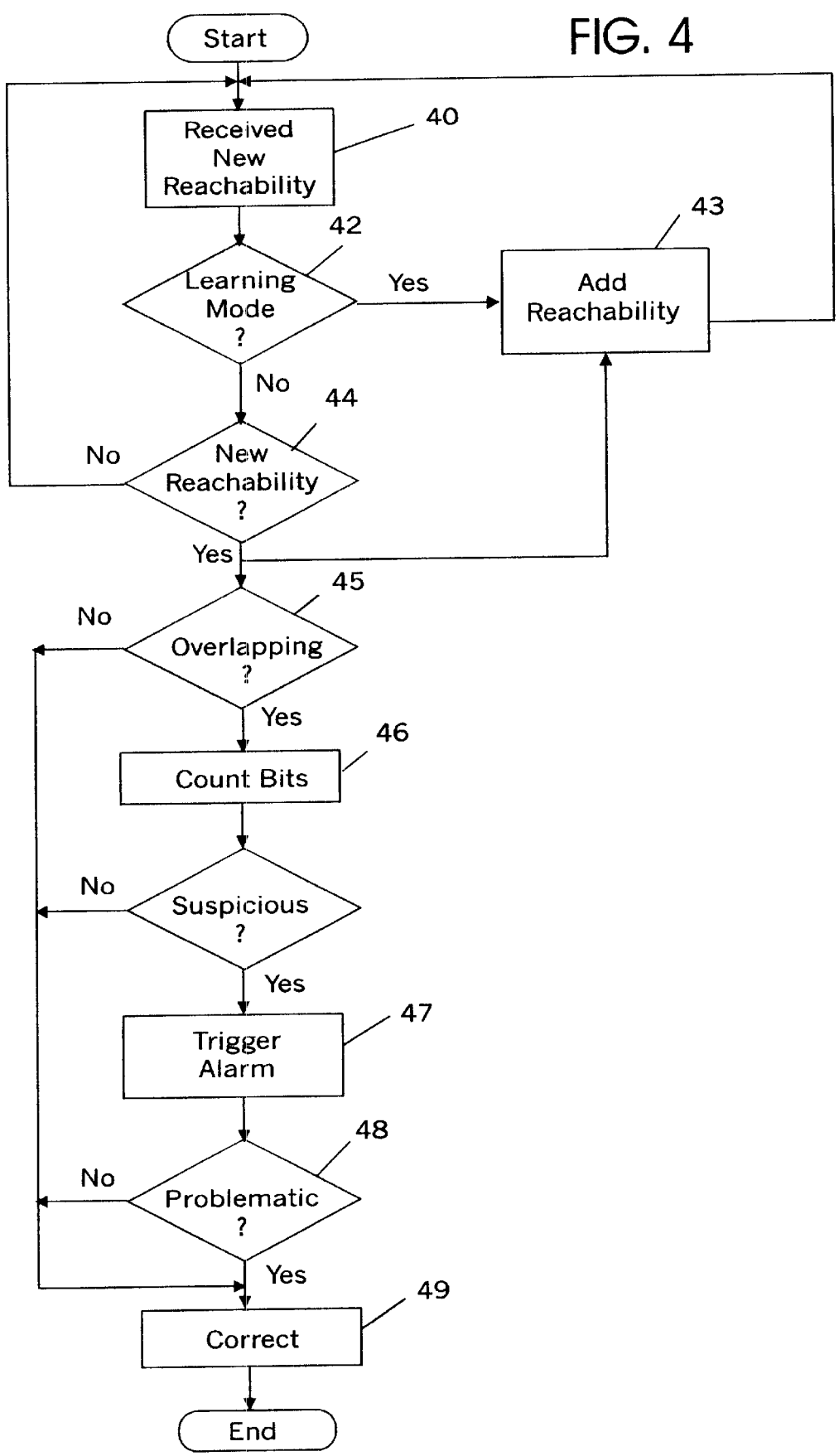
FIG. 4 is a flow diagram on the operation of the network of FIGS. 1 to 3 in accordance with the present invention.

Referring now to FIG. 4, in the PNNI protocol, a checking switch checks for receipt of a new reachability 40. On the receipt of a PTSE if a new reachability is received, we proceed to the process of the invention. The process of the invention then determines from the model if the checking switch is in learning mode or active mode 42. In learning mode, the switch first clears its database of all reachability data. Then as each new reachability is added to the database, the system checks for further new reachabilities. This continues until the end of the learning mode phase. At the end of the learning mode phase, the database of the checking switch contains all the reachability sets advertised by each node during the learning mode phase in accordance with the PNNI protocol.

Upon the receipt of a PTSE while the network is operating in the active mode phase, the checking switch examines the reachability to determine if it is new 44. If it is new, it adds the reachability 43 and if the new reachability overlaps any of the reachabilities of the switches in the peer group, the number of bits in the prefix of the new reachability are counted 46 and compared with the number of hits (or length) of the overlapped reachabilities. If the prefix of the new reachability is sufficiently longer (say four bits) than the prefix of any overlapped reachability, the overlapping is ignored and the check of the new reachability ends. However, if the prefix of the new reachability is less than the specified limit (here 4 bits) then the logic determines that the new reachability is suspicious. After it has been determined that the reachability is suspicious, an alarm is triggered 47 and the network supervisor is notified to determine if the new reachability is problematic 48. If the supervisor determines that the reachability does not constitute a problem, the check of the new reachability ends. If the new reachability is problematic, the problem is corrected 49 by the supervisor.

Of course, it is desirable to limit the number of false alarms that are triggered. This can be done by raising the number of bits by which the prefix of the new reachability must exceed any overlapped reachability before the overlapping is considered nonsuspicious. This is done at the risk of missing a problematic reachability. An alternative would be to examine the significance of the switches in the peer group 43, and establish individual levels that must be exceeded that depend on the criticality of the switch. Also, the program can look at the number of alarms that occur in a fixed period of time, and if there are multiple sources for the overwriting reachabilities in order to limit the number of alarms that are set.

Figure 5:
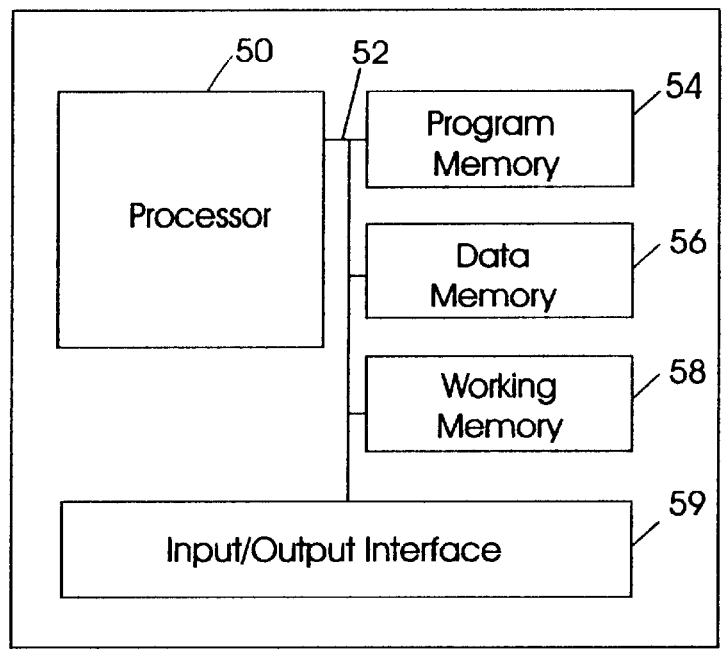
FIG. 5 is a block diagram of a processor and associated elements contained in a switch of the network of FIGS. 1 to 3.

Referring now to FIG. 5, each node contains a processor 50 which has associated through a bus 52 with program memory elements or computer usable media 54 containing software that performs the functions of FIG. 4. It also has data memory elements 56 which the reachabilities and identities of the other switches of the peer group are retained, working memory elements 58 which is used in performing the steps outlined in FIG. 4 and a input/output interface 59 for the receipt and transfer of the PTSEs on the network.

Figure 6:
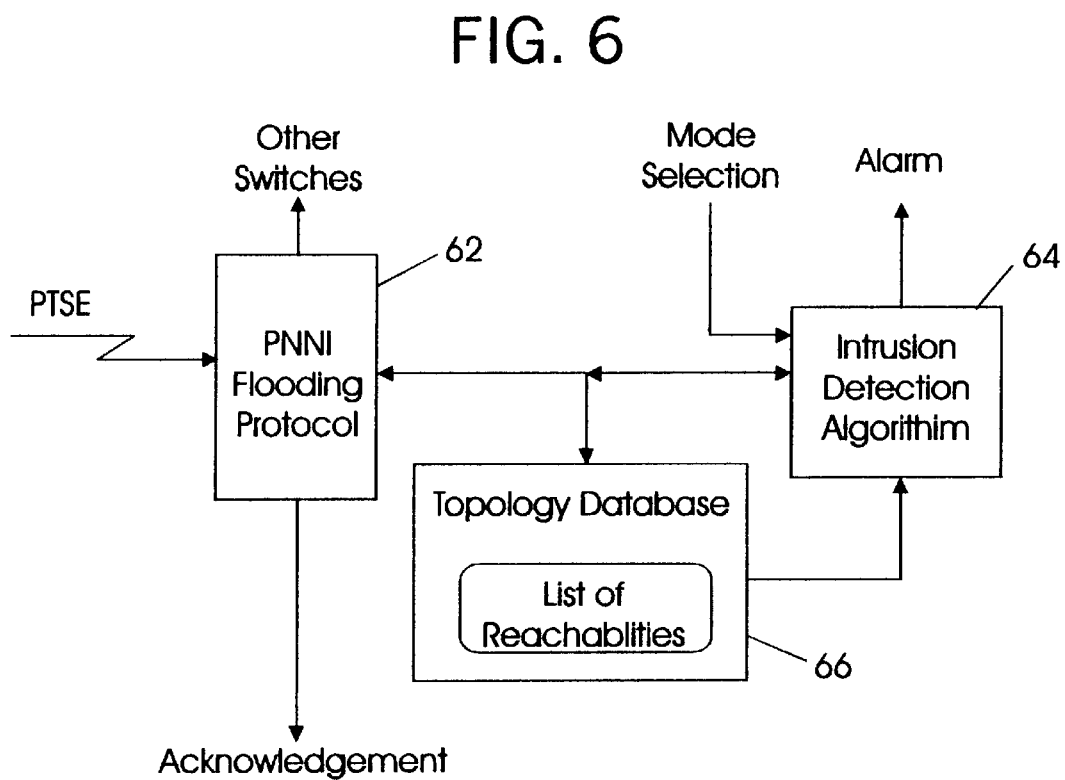
FIG. 6 is a block diagram showing elements of the intrusion detection system of the present invention.

As shown in FIG. 6, upon receipt of a PTSE packet by the switch before the PNNI flooding protocol 62 is initiated. The reachability advertised by the sending node is checked by the intrusion detection algorithm 64 to see if the packet is suspicious as established by the requirements of the algorithm illustrated in FIG. 4. If the algorithm is violated, an alarm is set off for the supervisor to determine if the reachability is problematic and to institute the appropriate remedy including removing the problematic reachability from any other switch, and possibly removing the sending switch from the network.

Above we have described one embodiment of the invention. of course it is understood that those skilled in the art may provide modifications and improvements to this embodiment. For instance, the normal behavior model could be a dynamically modified model requiring that the database keep both the present and previously announced reachabilities of switches. Also, instead of raising a single alarm covering all types of conditions, different level alarms can be used to indicate the severity of the intrusions. Therefore it is understood that the invention is not limited to this one particular embodiment but shall be interpreted by the spirit and scope of the appended claims.

We claim:

1. A method to detect the dissemination of new reachability information on a communication network that will result in a switch advertising the new reachability information to problematically overlap another switch, the method comprising:

providing a processor of a checking switch with a model of previous behavior of the network built from a topology database of reachability information of other switches for use to distinguish between suspicious and nonsuspicious reachabilities;

causing the processor to compare the new reachability information to reachabilities in the model to determine if the new reachability information is suspicious; and providing an alarm when the new reachability information results a suspicious overlapping of said another switch by the switch advertising the new reachability.

2. The method of claim 1 including dividing the operation of the checking switch into learning and active modes and having the model indicate the new reachability information is nonsuspicious if received during the learning mode even if the new reachability information results in the sending switch overlapping said another switch.

3. The method of claim 2 including comparing the new reachability information with the reachability information of said another switch when the new reachability information is received during the active mode to determine if the new reachability information results in causing an overlapping of said another switch.

4. The method of claim 3 including treating the new reachability information as causing overlapping of said another switch when the prefix of the new reachability information is longer than that of said another switches.

5. The method of claim 4 including arranging the sending switch, the other switches including said another switch and the checking switch in a common peer group and flooding reachability information from one to another so that the databases of all the switches in the peer group contain the same reachability information.

6. The method of claim 5 wherein said checking switch is the only switch in the peer group checking for suspicious reachabilities.

7. An ATM network which has switches arranged in peer groups which switches each have a processor with topology databases supplied reachability information by a flooding algorithm that results in the databases of the switches of a peer group each containing the same reachability information, said peer groups being characterized by having a checking switch with a software program used by its processor to check reachability information supplied to it, said program comprising:

code for comparing new reachability information to information already in the database of the checking switch to determine if the new reachability information results in a suspicious overlapping of another switch in the peer group by the switch providing the new reachability information; and code for providing an alarm to a network supervisor when the overlapping by the switch providing the information is suspicious.

8. The ATM network of claim 7 including code for dividing the operation of the checking switch into learning and active modes and having the model indicate the new reachability information is nonsuspicious if received during the learning mode even if the new reachability information results in the sending switch overlapping said another switch.

9. The ATM network of claim 8 including code for comparing the new reachability information with the reachability information of said another switch when the new reachability information is received during the active mode to determine if the new reachability information results in causing an overlapping of said another switch.

10. The ATM network of claim 9 including code for treating the new reachability information as causing overlapping of said another switch when the prefix of the new reachability information is longer than that of said another switches.

11. The ATM network of claim 10 including code for arranging the sending switch, the other switches including said another switch and the checking switch in a common peer group and flooding reachability information from one to another so that the databases of all the switches in the peer group contain the same reachability information.

12. The ATM network of claim 11 wherein said checking switch is the only switch in the peer group checking for a suspicious reachability.

* * * * *